Sept. 24, 1929.  A. W. MacVEY  1,729,223
DENTAL APPARATUS
Original Filed Aug. 21, 1923
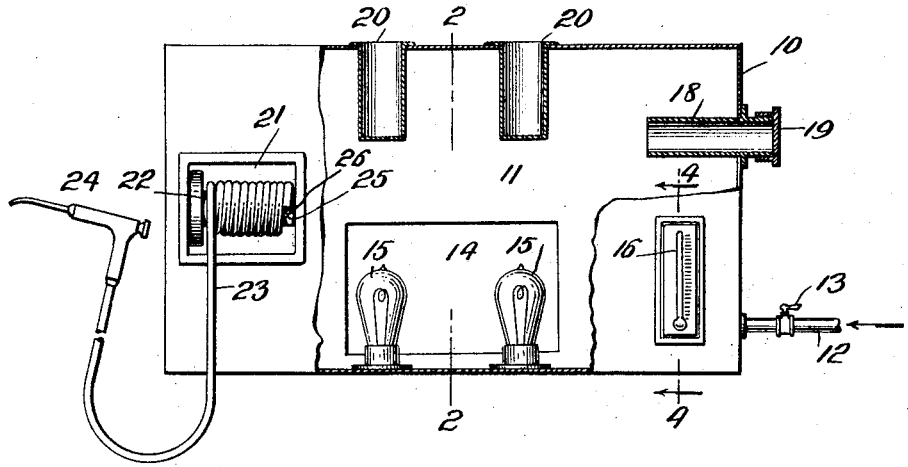
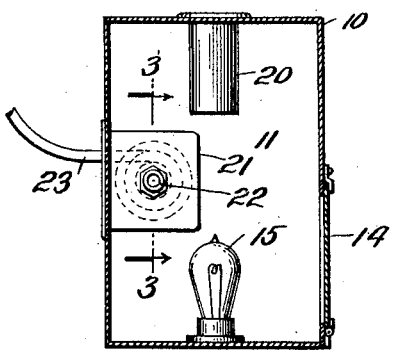
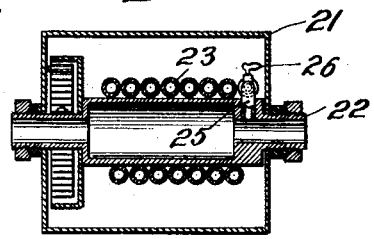
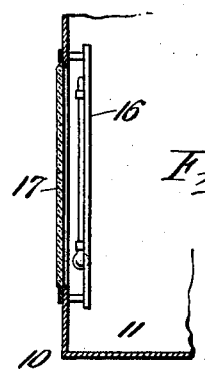
INVENTOR:
ARTHUR W. MAC VEY.
BY
Charles C. Gill
ATTORNEY.

Patented Sept. 24, 1929

1,729,223

UNITED STATES PATENT OFFICE.

ARTHUR W. MacVEY, OF BROOKLYN, NEW YORK

DENTAL APPARATUS

Application filed August 21, 1923, Serial No. 658,507. Renewed January 28, 1927.

The invention relates to dental apparatus, and its object is to provide improved, convenient and highly efficient means for supplying either medicated or unmedicated heated air or gas to a syringe for introduction into the cavity of a tooth under treatment. Various forms of apparatus have been devised for delivering heated air to a dental syringe and various dental syringes having electric heating units embodied therein have been produced, but my experience is that no entirely convenient, reliable and efficient apparatus for the intended purposes has heretofore been available.

In accordance with my invention I dispense with heating units on the syringe and I avoid applying direct heat to the pipe or tube through which the air flows to the syringe, and on the contrary I provide an independent chamber within which an adequate body of compressed air is heated to the requisite temperature and which supplies the heated air to a simple form of syringe or nozzle, the air from a conveniently located compressed air tank being conducted by a pipe to said chamber and the heated air passing from said chamber through a suitable flexible tube to the syringe or nozzle. The chamber or reservoir containing the reserve body of air may be heated by an electric bulb or electric bulbs placed therein or by an electric heating unit, and into this chamber may be introduced aromatic oils, or disinfectants or other medicinal or beneficial substance to be absorbed into the heated air, for modifying the character of the air introduced into the mouth of the patient.

The invention will be fully understood from the detailed description hereinafter presented, reference being had to the accompanying drawings, in which:

Fig. 1 is a side elevation, partly broken away and partly in section of an apparatus embodying my invention;

Fig. 2 is a vertical transverse section through the same, taken on the dotted line 2—2 of Fig. 1;

Fig. 3 is a vertical section through a portion of the apparatus, taken on the dotted line 3—3 of Fig. 2, and Fig. 4 is a vertical section through a portion of the same, taken on the dotted line 4—4 of Fig. 1.

In the drawings 10 designates a suitable box or cabinet furnishing a chamber 11 designed to receive and hold an adequate body of compressed air, the air being taken from the usual compressed air tank, not shown, commonly possessed by dentists and which tank is in communication with the chamber 11 through a suitable connecting pipe or tube 12 having a manually operative valve 13 by which to control and regulate the flow of air to said chamber.

The box or cabinet 10 is shown as rectangular in outline but it may be of any desirable or convenient shape and formed of any suitable material and preferably will be made wholly or in part of heat non-conducting material. At some convenient location the cabinet 10 will be provided with a door 14 for access to the chamber 11.

Within the chamber 11 will be provided means for heating the air therein, and at present I illustrate two electric lamp bulbs 15 of usual type for heating the compressed air admitted to said chamber.

I also provide the chamber 11 with a thermometer 16 located behind a glass panel 17 through which the readings on the thermometer may be observed, the purpose of the thermometer being to enable me to maintain the desired degree of heat within said chamber. In lieu of the thermometer 16 I may employ a thermostat for maintaining a proper degree of temperature within the chamber 11.

The cabinet 10 is provided with a tubular socket 18 through which aromatic oils or disinfectants or the like may be introduced into the air within the chamber 11. The oils or other substance may be held by plugs of raw cotton inserted within the socket 18, which is open at its inner end to permit the medicinal substance to be absorbed into the body of air within the chamber 11. The outer end of the socket 18 will be closed by a removable cap 19.

In the top of the cabinet 10 will preferably be suspended a suitable number of open-top receptacles 20, which are exposed to the heat of the chamber 11 and may receive the spray-bottles used by dentists.

In one side of the cabinet 10 is secured an inserted box-like casing 21 which is open at its outer side, and in the ends of this casing I mount a spring-roller 22, of the usual spring curtain-roller type, on which is wound a flexible tube 23 having on its outer end a valved syringe or nozzle 24 adapted to deliver heated air into the cavity of a tooth under treatment. The roller 22 is hollow and opens into the chamber 11 at one or both ends, and tapped into this roller, near one end thereof, is a nipple 25 which opens into the chamber of the hollow roller and receives the inner end of the tube 23, whereby communication may be established between the chamber 11 and tube 23. The nipple 25 has an ordinary valve 26 by which the flow of air from the chamber 11 into the tube 23 may be controlled or cut-off entirely, it being the intention that the air shall not pass into the tube 23 except when the apparatus is in use. The tube 23 may be unwound from the drum or roller 22 to any necessary extent and be automatically rewound upon said drum or roller after the use of the syringe 24 has ceased. The tube 23 may be otherwise connected with the cabinet 10, but I prefer the employment for this purpose of the spring-roller 22 because of the conveniences this roller affords. The casing 21 and roller 22 are exposed to the heat of the chamber 11 and hence the air entering the tube 23 does not become chilled to any material extent on its passage to the syringe.

The chamber 11 forms a reservoir for an adequate reserve body of heated air which is always available for use, and this air may be conveniently maintained at a proper temperature. The invention permits of the use of a simple form of syringe 24 and dispenses with the complex and heavy well-known syringe having electric heat-units.

The invention provides a highly efficient and convenient apparatus for its intended purposes and the same will be understood from the foregoing explanations without further detailed description.

I may add that when a spray-bottle is removed from one of the receptacles 20 and used as a syringe on the end of the tube 23 in lieu of the nozzle 24, the spray of warm liquid and warm air will be very comforting to a person having sensitive teeth.

What I claim as my invention and desire to secure by Letters-Patent, is—

1. Apparatus of the character described comprising a cabinet affording a closed chamber for a body of compressed air, a valved connection leading therefrom for communication with a supply of air under pressure, means for heating the air within said chamber, a valved outlet for heated air from said chamber, and a flexible tube connected with said outlet and having on its outer end a syringe having a manually operative control valve.

2. Apparatus as claimed in claim 1, in which the cabinet has a socket inserted through the wall thereof to receive and expose to the air of said chamber a plug holding a substance to be absorbed into the heated air, said socket having a removable closure cap on its outer end to permit the admission to and removal from said socket of said plug.

3. Apparatus as claimed in claim 1, having a spring roller mounted thereon on which said flexible tube is wound, and in which the outlet for heated air from said chamber to said tube is through said roller.

4. Apparatus as claimed in claim 1, in which the cabinet has set into one side thereof a box which is open at its outer end and in which box is mounted a spring-roller on which said tube is wound, the spring-roller having a hollow interior in communication with said chamber, and the inner end of said tube being connected to said hollow interior of the spring-roller.

5. In combination with a syringe, a flexible tube for conducting compressed air to the syringe, a spacious storage chamber for a reserve of compressed air, to which said tube is connected, means for heating the compressed air in said storage chamber, and valve means for controlling the supply of compressed heated air to the syringe and located between the said syringe and storage chamber.

6. Apparatus of the character described, comprising a cabinet having an air chamber, means for heating air admitted in the chamber, a casing in the chamber open at the outside of the cabinet, a flexible tube having a connection, through the casing, with the chamber, means for storing the tube in the casing for removal and replacement, the tube having a valve-controlled outlet, whereby heat is imparted to the tube when it is stored in the said casing.

7. In apparatus of the character described, spacious means for storing a reserve of compressed air, means for heating the compressed air within the storing means, an outlet from the storing means for the heated air, a tubular conductor leading from the outlet, and a valve in the conductor for controlling the passage of the compressed heated air through the conductor.

Signed at New York city, in the county of New York and State of New York, this 17 day of August, A. D. 1923.

ARTHUR W. MacVEY.